United States Patent Office.

JOHN KING, OF WARREN COUNTY, OHIO.

Letters Patent No. 95,695, dated October 12, 1869.

IMPROVED LINIMENT AND MEDICAL COMPOUND.

The Schedule referred to in these Letters Patent and making part of the same.

*To all whom it may concern:*

Be it known that I, JOHN KING, of Warren county, in the State of Ohio, have invented a certain Medical Compound, called "King's Magic Ohio Liniment," to be employed as a local application, or anodyne embrocation, in the cure of rheumatism or gouty affections of the joints, sprains, cuts, burns, and scalds, also, as a rubefacient for glandural swellings, it having a discutient effect, and for inflammatory affections of the throat, and catarrhal and other pectoral complaints.

The nature of my invention consists in combining, in one compound, several ingredients, whose separate use and beneficial effect as liniments are well known to medicine, some as a cure for rheumatism, sprains, and affections of the joints, others for scalds, burns, or cuts, and similar affections of the skin, while others, again, are applied for affections of the throat and glands.

My compound acts beneficially in all such cases, combining in itself the virtues, and obviating the necessity for the use of several separate liniments.

My liniment is composed of "number 6," (a well-known medical compound,) spirits of turpentine, spirits of camphor, and liquid ammonia, prepared in manner and proportion as follows:

I take, of number 6, half a pint; spirits of turpentine, half a pint; spirits of camphor, one gill; liquid ammonia, one ounce, (liquid,) and mix them well together.

It is applied locally, as other liniments or rubefacients, but having a powerful effect on the skin, it should be used with care, and not allowed to remain long on the affected parts, or be applied as an ointment, or it will blister the skin.

Full directions for its use are given with the composition when prepared for sale.

I claim the preparation of a medical compound, which I denominate "King's Magic Ohio Liniment," of the ingredients, in the proportions, and for the purposes set forth.

JOHN KING.

Witnesses:
J. KELLY O'NEALL,
N. V. CLEAVER.